(No Model.)

J. W. CARNS.
THILL COUPLING.

No. 300,045. Patented June 10, 1884.

Witnesses:
Harry Frease
R. Z. Wise

Inventor:
John W. Carns
Per Fred W. Bond
Atty

UNITED STATES PATENT OFFICE.

JOHN W. CARNS, OF PIERCE, OHIO, ASSIGNOR OF ONE-HALF TO GEORGE WALKER, JR., OF SAME PLACE.

THILL-COUPLING.

SPECIFICATION forming part of Letters Patent No. 300,045, dated June 10, 1884.

Application filed April 8, 1884. (No model.)

*To all whom it may concern:*

Be it known that I, JOHN W. CARNS, a citizen of the United States, residing at Pierce, in the county of Stark and State of Ohio, have invented certain new and useful Improvements in Thill-Couplings; and I do hereby declare that the following is a full, clear, and exact description of the same, reference being had to the annexed drawings, making a part of this specification, and to the letters and figures of reference marked thereon, in which—

Figure 1:
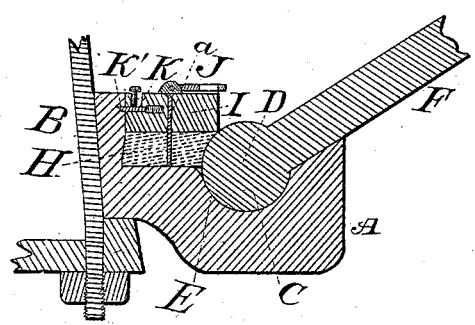
Figure 2:
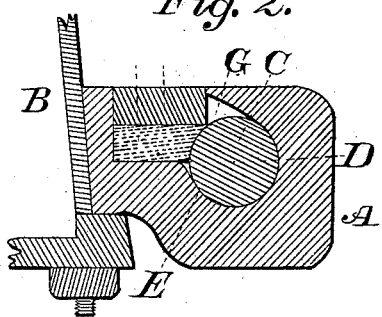
Figure 3:
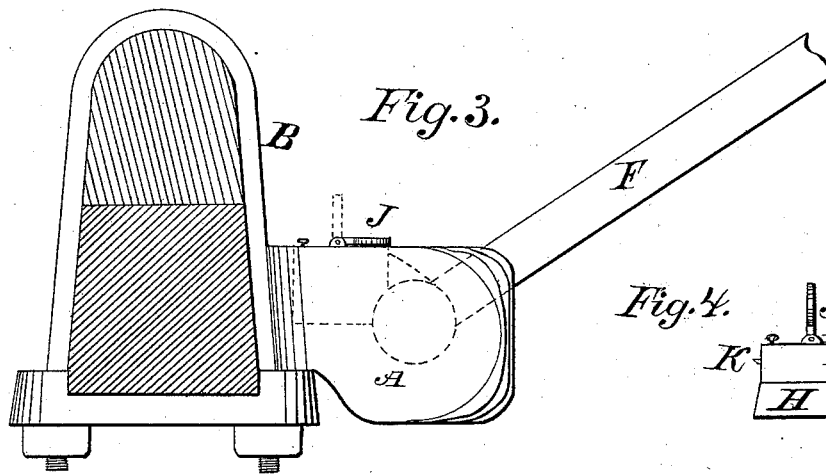
Figure 4:
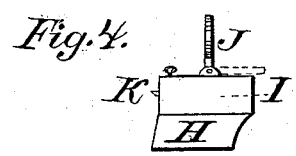
Figure 5:
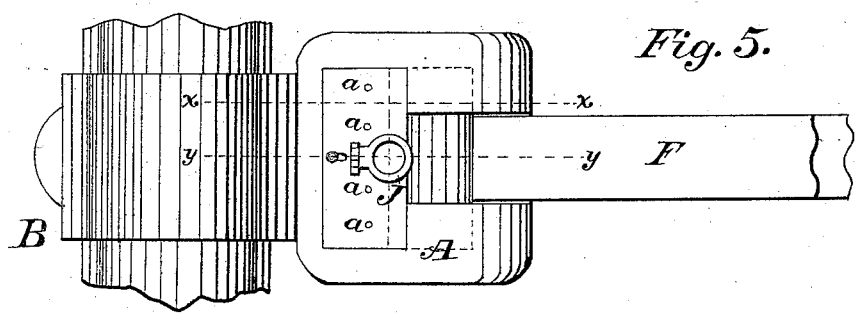

Figure 1 is a longitudinal section on line $y\,y$. Fig. 2 is a longitudinal section on line $x\,x$. Fig. 3 is a side view. Fig. 4 is a detached view of rubber and cap. Fig. 5 is a top view.

The present invention has relation to thill-couplings which shall be easily adjusted and at the same time well adapted for the purpose designed; and its nature consists in providing a socket substantially of the form shown in the drawings, and in providing a cap, and in the several parts and combination of parts hereinafter described, and pointed out in the claims.

Similar letters of reference indicate corresponding parts in the drawings.

In the accompanying drawings, A represents the socket, which is attached to the forward axle by means of the clip B in the usual manner. This socket is provided with the recess G, which is for the purpose of receiving the head D. The recess is provided with the shoulder E, and is so arranged that the rear part of the head D will rest against said shoulder, as seen in Figs. 1 and 2, and is for the purpose of holding the thills in proper position when the vehicle is being backed. The head D is formed on the rear end of the thill-iron F, and is placed in proper position by passing said head through the opening G. The rubber block H is substantially of the form shown in Fig. 4, and is rigidly held to the metallic cap I by the rivets $a$. The rear part of this rubber block is flaring, and is designed to fit the back of the socket A, as seen in Figs. 1 and 2. The metallic cap I is substantially of the form shown in the drawings, and fits the opening in the top or upper side of the socket A, as shown in Fig. 5, and is provided with the eye or handle J, which is for the purpose of adjusting the metallic cap and rubber block H. This metallic cap I is also provided with a spring-catch, K, which fits into the recess K', and is operated by a knob in the ordinary manner. In use the head D is passed through the inclined openings G until it reaches the point shown in Figs. 1 and 2, and the metallic cap I and rubber block H is placed in the position shown in the drawings, and securely held in proper position by means of the catch K and recess K'.

I am aware that it is not new to form a socket to receive and hold the head of a thill-iron; but

What I claim as new, and desire to secure by Letters Patent, is—

1. The combination of the socket A, provided with the inclined openings G, the shoulder E, the head D, the rubber block H, rigidly attached to the metallic cap I, the eye or handle J, and the clip B, all arranged substantially as shown, and for the purpose specified.

2. The metallic cap I, provided with the spring-catch K, in combination with the socket A, provided with the recess K', substantially as and for the purpose specified.

In testimony that I claim the above I have hereunto subscribed my name in presence of two witnesses.

JOHN W. CARNS.

Witnesses:
R. Z. WISE,
FRED. W. BOND.